United States Patent
Otani et al.

(10) Patent No.: US 9,883,076 B2
(45) Date of Patent: Jan. 30, 2018

(54) IMAGE FORMATION WITH GRADATION VALUE OF BOUNDARY PIXELS CORRECTED USING CUMULATIVE SUM OF GRATAION VALUES OF PIXELS IN SIGNIFICANT IMAGE PORTION

(71) Applicant: CANON KABUSHIKI KAISHA, Tokyo (JP)

(72) Inventors: Ryosuke Otani, Tokyo (JP); Yoichi Takikawa, Kawasaki (JP); Hidenori Kanazawa, Mishima (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/352,437

(22) Filed: Nov. 15, 2016

(65) Prior Publication Data

US 2017/0155797 A1   Jun. 1, 2017

(30) Foreign Application Priority Data

Nov. 26, 2015   (JP) ................. 2015-230697

(51) Int. Cl.
| | |
|---|---|
| H04N 1/407 | (2006.01) |
| H04N 1/409 | (2006.01) |
| G06K 15/02 | (2006.01) |
| G03G 15/00 | (2006.01) |
| H04N 1/29 | (2006.01) |
| G06K 15/12 | (2006.01) |

(Continued)

(52) U.S. Cl.
CPC ....... H04N 1/4092 (2013.01); G03G 15/5062 (2013.01); G06K 15/1223 (2013.01); G06K 15/1874 (2013.01); H04N 1/06 (2013.01); H04N 1/29 (2013.01); H04N 1/407 (2013.01); G06K 15/14 (2013.01)

(58) Field of Classification Search
None
See application file for complete search history.

(56) References Cited

U.S. PATENT DOCUMENTS

| 9,749,496 B2 * | 8/2017 | Fujimoto ............... H04N 1/405 |
| 2016/0266512 A1 * | 9/2016 | Haruta ................. G03G 15/043 |

FOREIGN PATENT DOCUMENTS

| JP | 2000-36912 A | 2/2000 |
| JP | 2009-105943 A | 5/2009 |

* cited by examiner

Primary Examiner — Scott A Rogers
(74) Attorney, Agent, or Firm — Canon U.S.A., Inc. IP Division

(57) ABSTRACT

An image forming apparatus includes a reading unit for sequentially reading, from image data, pieces of pixel data of target pixels along a predetermined direction, a cumulative sum calculation unit for calculating a cumulative sum of gradation values represented by pieces of pixel data of target pixels in a significant image portion read by the reading unit, a determination unit for determining whether the target pixel read by the reading unit is located at a boundary between the significant image portion and a background portion that is a non-significant image portion, and a correction unit for correcting, if the determination unit determines that the target pixel is located at the boundary, a gradation value represented by pixel data of the target pixel by adding a correction amount based on the cumulative sum up to the target pixel calculated by the cumulative sum calculation unit to the gradation value.

8 Claims, 13 Drawing Sheets

(51) Int. Cl.
*H04N 1/06* (2006.01)
*G06K 15/14* (2006.01)

FIG. 6

| CUMULATIVE GRADATION VALUE | CORRECTION AMOUNT |
|---|---|
| 1 | 255 |
| 2 | 254 |
| 3 | 254 |
| ⋮ | ⋮ |
| 128 | 192 |
| ⋮ | ⋮ |
| 255 | 128 |
| ⋮ | ⋮ |
| ⋮ | ⋮ |
| ⋮ | ⋮ |
| 510 | 32 |
| ⋮ | ⋮ |
| ⋮ | ⋮ |
| ⋮ | ⋮ |
| 765 | 16 |
| ⋮ | ⋮ |
| ⋮ | ⋮ |
| ⋮ | ⋮ |
| 1024 | 0 |

FIG. 10A

| CUMULATIVE GRADATION VALUE | CORRECTION AMOUNT |
|---|---|
| 1 | 255 |
| 2 | 254 |
| 3 | 254 |
| ⋮ | ⋮ |
| 128 | 192 |
| ⋮ | ⋮ |
| 255 | 128 |
| ⋮ | ⋮ |
| ⋮ | ⋮ |
| ⋮ | ⋮ |
| 510 | 32 |
| ⋮ | ⋮ |
| ⋮ | ⋮ |
| ⋮ | ⋮ |
| 765 | 16 |
| ⋮ | ⋮ |
| ⋮ | ⋮ |
| ⋮ | ⋮ |
| 1024 | 0 |

FIG. 10B

| CUMULATIVE GRADATION VALUE | CORRECTION AMOUNT |
|---|---|
| 1 | -254 |
| 2 | -253 |
| 3 | -252 |
| ⋮ | ⋮ |
| 127 | -128 |
| ⋮ | ⋮ |
| 255 | -64 |
| ⋮ | ⋮ |
| ⋮ | ⋮ |
| ⋮ | ⋮ |
| 510 | -16 |
| ⋮ | ⋮ |
| ⋮ | ⋮ |
| ⋮ | ⋮ |
| 765 | 0 |
| ⋮ | ⋮ |
| ⋮ | ⋮ |
| ⋮ | ⋮ |
| 1024 | 0 |

FIG. 14

| CUMULATIVE GRADATION VALUE | CORRECTION AMOUNT |
|---|---|
| 1 | 15 |
| 2 | 14 |
| 3 | 14 |
| ⋮ | ⋮ |
| 8 | 12 |
| ⋮ | ⋮ |
| 16 | 8 |
| ⋮ | ⋮ |
| ⋮ | ⋮ |
| ⋮ | ⋮ |
| 32 | 2 |
| ⋮ | ⋮ |
| ⋮ | ⋮ |
| ⋮ | ⋮ |
| 48 | 1 |
| ⋮ | ⋮ |
| ⋮ | ⋮ |
| ⋮ | ⋮ |
| 64 | 0 |

IMAGE FORMATION WITH GRADATION VALUE OF BOUNDARY PIXELS CORRECTED USING CUMULATIVE SUM OF GRATAION VALUES OF PIXELS IN SIGNIFICANT IMAGE PORTION

BACKGROUND

Field of Art

The present disclosure relates to a technique for forming an image on a recording medium using an electrophotographic method.

Description of the Related Art

Electrophotographic image forming apparatuses are known. Such an image forming apparatus forms an electrostatic latent image by emitting light onto a photosensitive member on the basis of image data, applies a developer to the electrostatic latent image (performs development), transfers and fixes the image to a recording medium such as a recording sheet, and outputs the recording medium. Representative examples of such an image forming apparatus include a laser beam printer and an LED printer. In such an image forming apparatus, at the time of the emission of a light beam or the formation of an electrostatic latent image, image degradation occurs. The contrast of a latent image potential formed on a photosensitive member decreases at that time. The relationship between a latent image potential on a photosensitive member and the amount of toner applied as a developer at the time of development is nonlinear, and is affected by the decrease in the contrast of a latent image potential. In the case of image data including a thin character or a thin line, the contrast of a latent image potential easily decreases and the thinning or detail loss of a line occurs at the time of formation of an image. The reproducibility of an output image therefore decreases.

Japanese Patent Laid-Open No. 2000-36912 or 2009-105943 discloses a technique for controlling the line width of input image data to improve the reproducibility of an output image. More specifically, a line width in image data is detected by referring to the image data of a portion around the edge of a thin line and the gradation value of the edge is changed using the amount of correction corresponding to the detected line width, so that the thin-line reproducibility of an output image is improved. With the technique disclosed in Japanese Patent Laid-Open No. 2000-36912 or 2009-105943, the amount of correction is changed in accordance with a line width in image data. It is therefore considered to be possible to faithfully reproduce a thin line on an output image on the basis of the image data.

However, the technique disclosed in Japanese Patent Laid-Open. No. 2000-36912 or 2009-105943, in which the image data of a portion around the edge of a thin line is referred to for the detection of the width of the thin line, requires a large hardware circuit size and a high calculation cost.

SUMMARY

An embodiment of the present invention provides an image forming apparatus for forming an image by performing scanning exposure upon a photosensitive member on the basis of a gradation value represented by pixel data. The image forming apparatus includes a reading unit configured to sequentially read, from image data, pieces of pixel data of target pixels along a predetermined direction, a cumulative sum calculation unit configured to calculate a cumulative sum of gradation values represented by pieces of pixel data of target pixels in a significant image portion read by the reading unit, a determination unit configured to determine whether the target pixel read by the reading unit is located at a boundary between the significant image portion and a background portion that is a non-significant image portion, and a correction unit configured to, in a case where the determination unit determines that the target pixel is located at the boundary, correct a gradation value represented by pixel data of the target pixel by adding a correction amount based on the cumulative sum up to the target pixel calculated by the cumulative sum calculation unit to the gradation value.

Further features of the present invention will become apparent from the following description of exemplary embodiments with reference to the attached drawings.

BRIEF DESCRIPTION OF THE DRAWINGS

FIG. 6 is a diagram illustrating an example of a correction amount table according to the first embodiment.

FIGS. 10A and 10B are diagrams illustrating examples of a correction amount table according to the second embodiment.

FIG. 14 is a diagram illustrating an example of a correction amount table according to the third embodiment.

DESCRIPTION OF THE EMBODIMENTS

Embodiments of the present invention will be described in detail below with reference to the accompanying drawings.

First Embodiment

<Relationship Between Data Image Width and Developed Image Width>

In an electrophotographic image forming apparatus, as a line width in image data decreases, an electrostatic latent image on a photosensitive member becomes shallower and the thin-line reproducibility of an output image decreases. The relationship between an image width in image data and an image width after development will be described below with reference to FIGS. 1A, 1B, and 1C by taking, as an example, a white-on-black line susceptible to thinning or a detail loss because of the degradation of an electrostatic latent image.

Figure 1A:
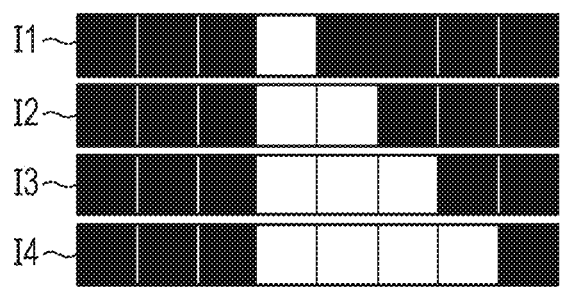
FIGS. 1A, 1B, and 1C are diagrams describing the relationship between a data image width and a developed image width.

FIG. 1A is a diagram illustrating exemplary pieces of image data of hollow lines (horizontal lines on which scanning exposure is performed with laser light) having a plurality of image widths. Referring to FIG. 1A, I1, I2, I3, and I4 represent widths of one pixel, two pixels, three pixels, and fourth pixels, respectively. In this example, a printer engine with 600 dpi is used. The size of a single pixel is therefore equivalent to one dot at 600 dpi (=2.54 cm/600≈0.0423=42.3 μm). In the image data of a white-on-black line, a pixel represented by white is a part of a significant image and a pixel represented by black is a non-significant around portion (background portion). A significant image portion and a non-significant image portion are hereinafter referred to as an image portion and a ground portion, respectively.

Figure 1B:
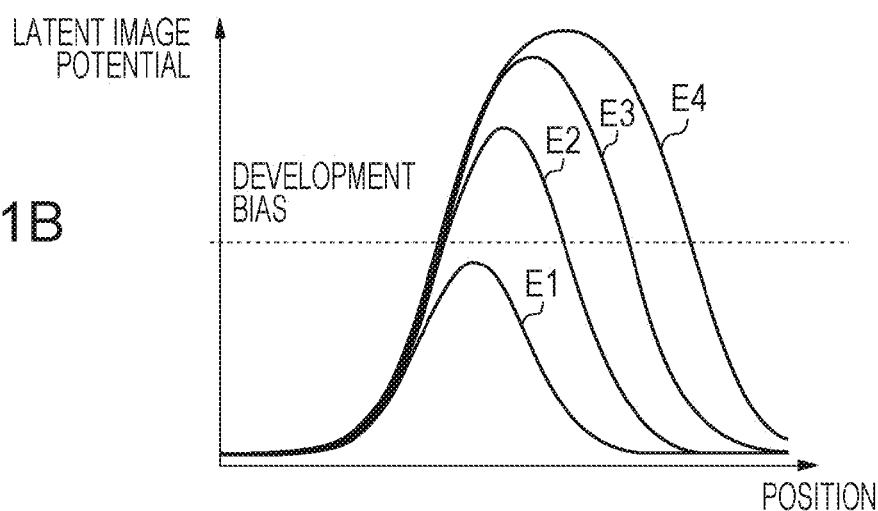
Figure 1C:
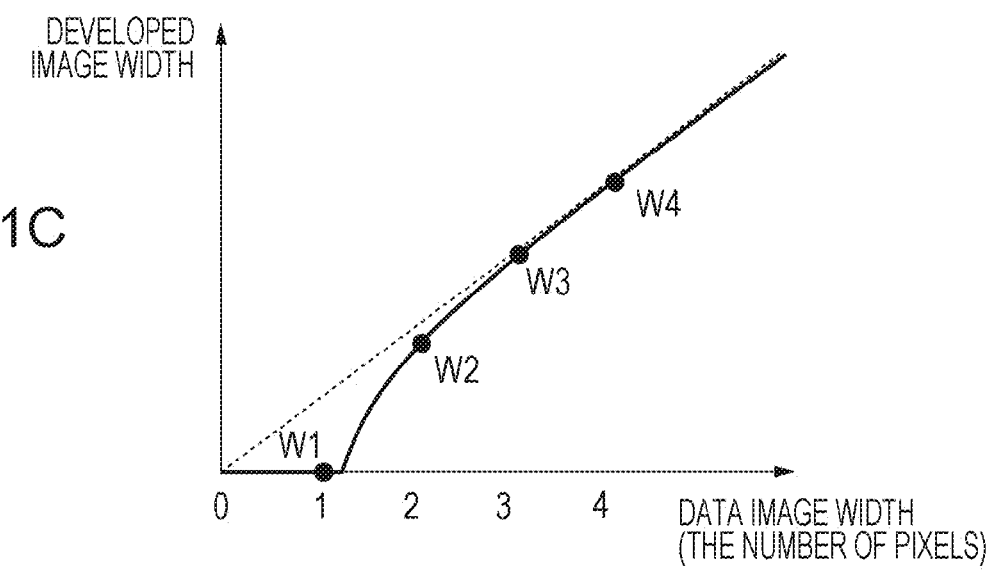

FIG. 1B is a diagram illustrating the potential distribution of an electrostatic latent image that is formed on a photosensitive member after exposure on the basis of each piece of image data illustrated in FIG. 1A. Referring to FIG. 1B, E1, E2, E3, and E4 represent the potential distributions of electrostatic latent images corresponding to I1, I2, I3, and I4 in. FIG. 1. As is apparent from FIG. 1B, the narrower the width of a white portion, the lower the contrast of a latent image potential (the difference between the maximum value and the minimum value) because of image degradation at the time of the emission of light beam or the formation of an electrostatic latent image (the contrast of a latent image potential: E1<E2<E3<E4). FIG. 1C is a diagram illustrating exemplary development line widths of toner images formed from the electrostatic latent images using a development bias represented by a dotted line in FIG. 1B. Referring to FIG. 1C, W1, W2, W3, and W4 represent development line widths corresponding to E1, E2, E3, and E4 in FIG. 1B. A dotted line in FIG. 1C represents a target line width (that is linear with respect to a data line width). The lower the latent image contrast, the larger the amount of toner transferred to a white portion. Accordingly, because of a toner fog or toner scattered from surrounding areas, the width of the hollow line decreases (becomes black) and goes away from the target line width (the difference from the target line width W1>W2>W3>W4). Another exemplary case other than the image data illustrated in FIG. 1A can be considered. For example, in the case of a pixel having a plurality of gradation levels, it is possible to control a line width by unit smaller than a single pixel by modulating the ON and OFF lengths of light beam in accordance with a gradation level (pulse width modulation). In this case, the relationship between an image data line width and a development line width is as represented by a solid line in FIG. 1C.

Descriptions have been made by taking only a hollow line as an example. In the case of a black line, when a latent image contrast decreases, the thinning or detail loss of a line may also occur because of the reduction in a toner adhesion amount or the scattering of toner to surroundings.

In the first embodiment, in order to suppress the occurrence of the thinning or detail loss of a thin line to improve the reproducibility of a developed image, correction processing is performed upon image data.

<System Configuration>

Figure 2:
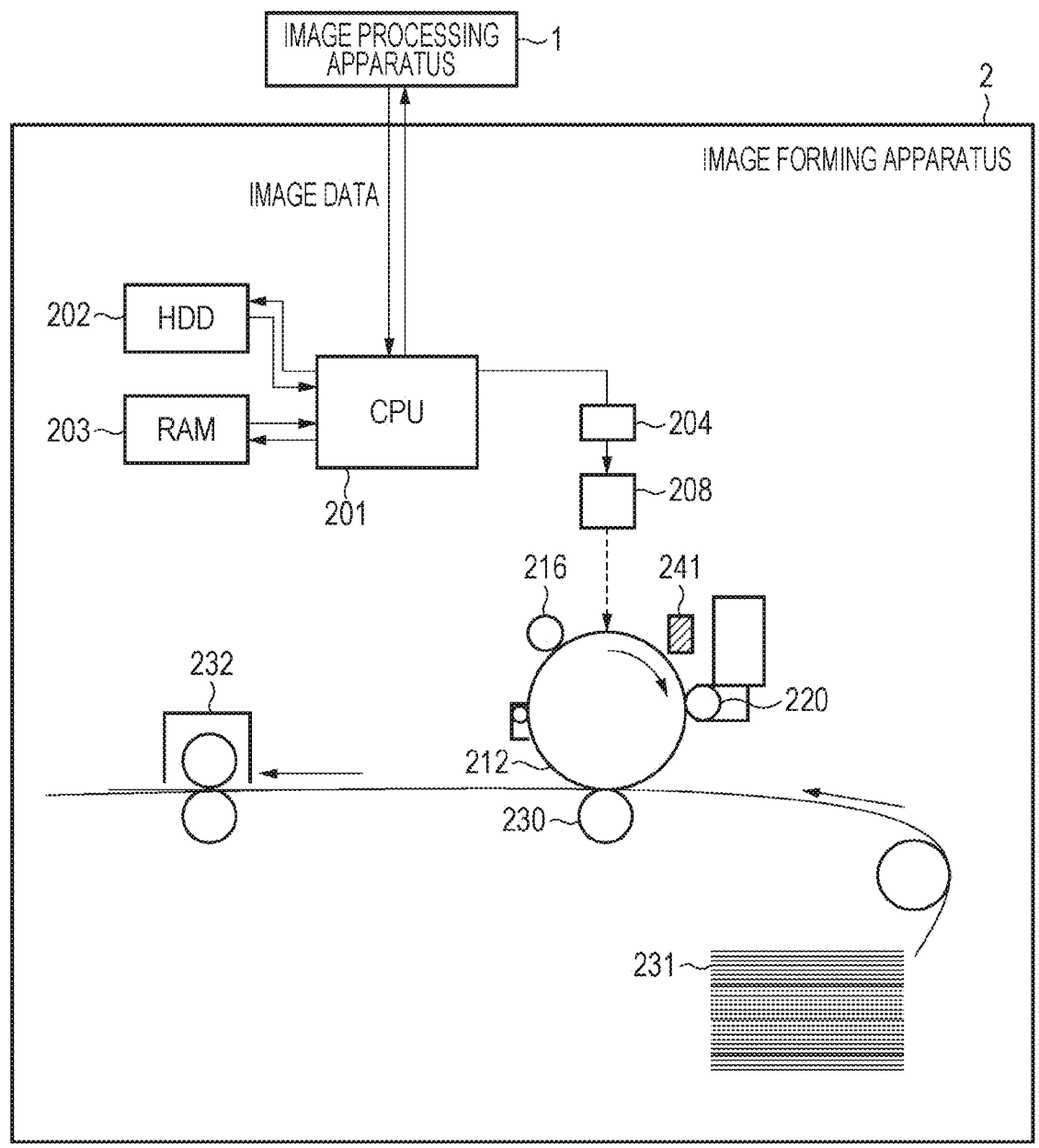
FIG. 2 is a block diagram illustrating the configuration of an image forming apparatus according to a first embodiment of the present invention.

FIG. 2 is a block diagram of an image forming apparatus 2 according to the first embodiment. An image processing apparatus 1 that is a supply source of recording target image data is connected to the image forming apparatus 2. The image processing apparatus 1 and the image forming apparatus 2 may communicate with each other using any communication method such as a wireless communication method (WiFi or Bluetooth®) or a wired communication method (USE interface or Ethernet interface). In this embodiment, the image processing apparatus 1 is an information processing apparatus such as common personal computer. An application for a print target image data and a printer driver for generating print data for the image forming apparatus 2 are installed in advance into the image processing apparatus 1.

The reduction in the reproducibility of an output image due to degradation in an electrostatic latent image depends on the engine design of the image forming apparatus 2, for example, the spot diameter of light beam or the latent image formation characteristics of a photosensitive drum. In order to absorb the difference in reproducibility due to engine design, is desired that line width correction processing be performed on an engine side. In the first embodiment, line width correction processing is therefore performed on an engine side on the basis of information about image data transmitted from a printer driver side. On the engine side, a shared memory used as an information processing work area or a temporary storage area is provided independently of a shared memory on the printer driver side.

The first embodiment provides an image forming apparatus and an image forming program capable of more easily improving thin-line reproducibility as compared with those not having this configuration.

<Image Forming Apparatus>

The image forming apparatus 2 includes a central processing unit (CPU) 201 for performing overall control processing, a hard disk drive (HDD) 202 for storing programs for line width correction processing and pulse width modulation processing which are performed by the CPU 201, and a Random Access Memory (RAM) 203 used as a work area at the time of the execution of a program. The CPU 201 executes a program stored in the RAM 203, performs line width correction processing and pulse width modulation processing upon image data stored in the RAM 203, and outputs the processed image data to a driving unit 204.

In the line width correction processing, the values of pixels (=gradation information) included in image data are sequentially read out. On the basis of the read gradation information of a pixel (hereinafter referred to as a "target pixel"), cumulative gradation value that s the cumulative sum of pieces of gradation information of a continuous image portion up to the target pixel is calculated. In a case where it is determined that a target pixel is located at the boundary between the image portion and a ground portion, the ground portion is changed to the image portion on the basis of the amount of image width correction based on the cumulative gradation value. That is, the width of the image portion is increased. The line width correction processing will be described in detail later.

The pulse width modulation processing is processing for expressing an intermediate density by modulating the ON and OFF lengths of light on the basis of the gradation value of image data. More specifically, a pulse signal having a width based on the gradation value of image data is generated. In accordance with this pulse, the ON and OFF of light beam are controlled. In the case of an image forming apparatus in which toner is applied to a portion exposed to light, the larger the gradation value of a black pixel, the longer the ON length of light (the larger the gradation value of a white pixel, the longer the OFF length of light). In this embodiment, control processing for shifting a pulse forward in unit pixels and control processing for shifting a pulse rearward in unit pixels are switched. By shifting the position of a pulse to couple the pulse to a surrounding pulse, an electrostatic latent image is stabilized. In a case where the image processing apparatus 1 creates shift control information indicating which direction each pixel is coupled to, the CPU 201 receives shift control information along with image data and stores them in the RAM 203. In this case, in the pulse width modulation processing, a pulse signal is generated on the basis of the gradation value of image data and the shift control information.

An image forming unit includes an exposure unit 208, a photosensitive drum 212 that is an image bearing member, a charger 216, and a developer 220.

Electrophotographic Image Formation will be Described Below.

(1) Charging

The charger 216 charges the surface of the rotating photosensitive drum 212 at a predetermined potential. The charging potential of the charger 216 is measured by an electrometer 241 facing the photosensitive drum 212 and is controlled so that a desired voltage is obtained.

(2) Exposure

The driving unit 204 modulates image data supplied from the CPU 201 into an exposure signal by exposure signal generation processing and drives the exposure unit 208 in accordance with the exposure signal. The exposure unit 208 performs scanning exposure on the rotating photosensitive drum 212 to form an electrostatic latent image on the photosensitive drum 212.

(3) Development

The developer 220 applies toner to the electrostatic latent image formed on the rotating the photosensitive drum 212 to generate a toner image.

(4) Transfer

A voltage is applied to a transfer roller 230 at a transfer nip where a recording medium (recording sheet) 231 and the photosensitive drum 212 are brought into contact with each other to transfer the toner image to the recording medium 231.

(5) Fixing

The recording medium including the toner image on its surface is transferred to a fixing unit 232. The heated fixing unit 232 applies heat and pressure to the recording medium and the toner image on the recording medium to fuse the toner image into place on the recording medium.

(6) Sheet Discharge

The recording medium including an output image on its surface is discharged from the image forming apparatus 2 via the fixing unit 232. Electrophotographic image formation ends in the image forming apparatus 2.

<Details of Line Width Correction Processing>

Figure 3:
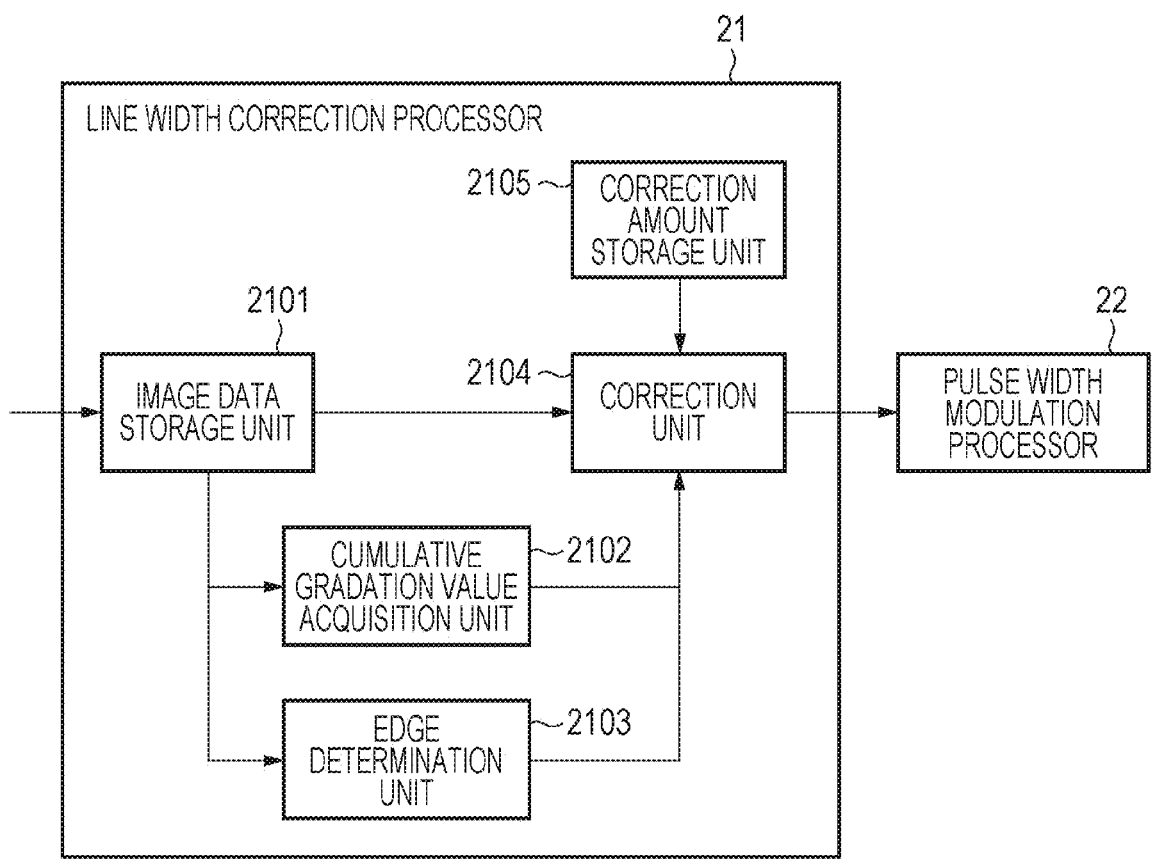
FIG. 3 is a block diagram illustrating the configuration of a processing unit according to the first embodiment.

Next, the line width correction processing performed by the image forming apparatus 2 according to an embodiment of the present invention will be described in more details. FIG. 3 is a functional block diagram of a line width correction processor realized when a program related to image formation is loaded from the HDD 202 into the RAM 203 and is executed by the CPU 201. Each unit is a procedure, a function, or a subroutine of the CPU 201, but may be realized with a piece of hardware.

A line width correction processor 21 performs line width correction processing upon image data transmitted from a printer driver in the image processing apparatus 1. The line width correction processor 21 includes an image data storage unit 2101, a cumulative gradation value acquisition unit 2102, an edge determination unit 2103, a correction unit 2104, and a correction amount storage unit 2105. A pulse width modulation processor 22 modulates the ON and OFF lengths of light on the basis of the gradation value of image data to express an intermediate density. The pulse width modulation processor 22 include, for example, a triangular wave generation circuit for generating an analog triangular wave synchronized with a pixel clock, a D/A circuit for converting the gradation value of image data into an analog signal (voltage signal), and a comparator for comparing a triangular wave generated by the triangular wave generation circuit and an analog signal representing the gradation value of pixel with each other. A signal output from the comparator pulse-width modulation. (PWM) signal having a width corresponding to the gradation value of a pixel.

It is assumed that image data transmitted from the image processing apparatus 1 is expressed with 8 bits per pixel (256 gradation levels).

The CPU 201 acquires image data in a scanning direction (predetermined direction) of light beam output from the image forming apparatus 2 in units of lines and stores them in the image data storage unit 2101 in the RAM 203. The cumulative gradation value acquisition unit 2102 sequentially reads pieces of pixel data stored in the image data storage unit 2101, acquires the cumulative sum of gradation values of pixels in the image data, and stores the cumulative sum as a cumulative gradation value. In the first embodiment, in order to improve the reproducibility of a hollow line where thinning or a detail loss easily occurs because of the image degradation of an electrostatic latent image, line width correction processing is performed focusing on the gradation level of a white portion. That is, calculation is performed on the assumption that the gradation value of a white pixel (having the minimum density level) of image data is 255 and the gradation value of a black pixel (having the upper limit of a density level) of image data is 0. In a case where image data in which the gradation value of a white pixel is 0 and the gradation value of a black pixel is 255 is input from the image processing apparatus 1, gradation values (0 to 255) are reversed. The edge determination unit 2103 detects the boundary between an image portion and a ground portion of image data. The correction amount storage unit 2105 stores the amount of gradation correction based on a cumulative gradation value. The correction unit 2104 corrects the gradation value of a target pixel determined to be an edge by the edge determination unit 2103 on the basis of the amount of correction stored in the correction amount storage unit 2105. The corrected image data is output to the pulse width modulation processor 22.

<Line Width Correction Process>

Figure 4:
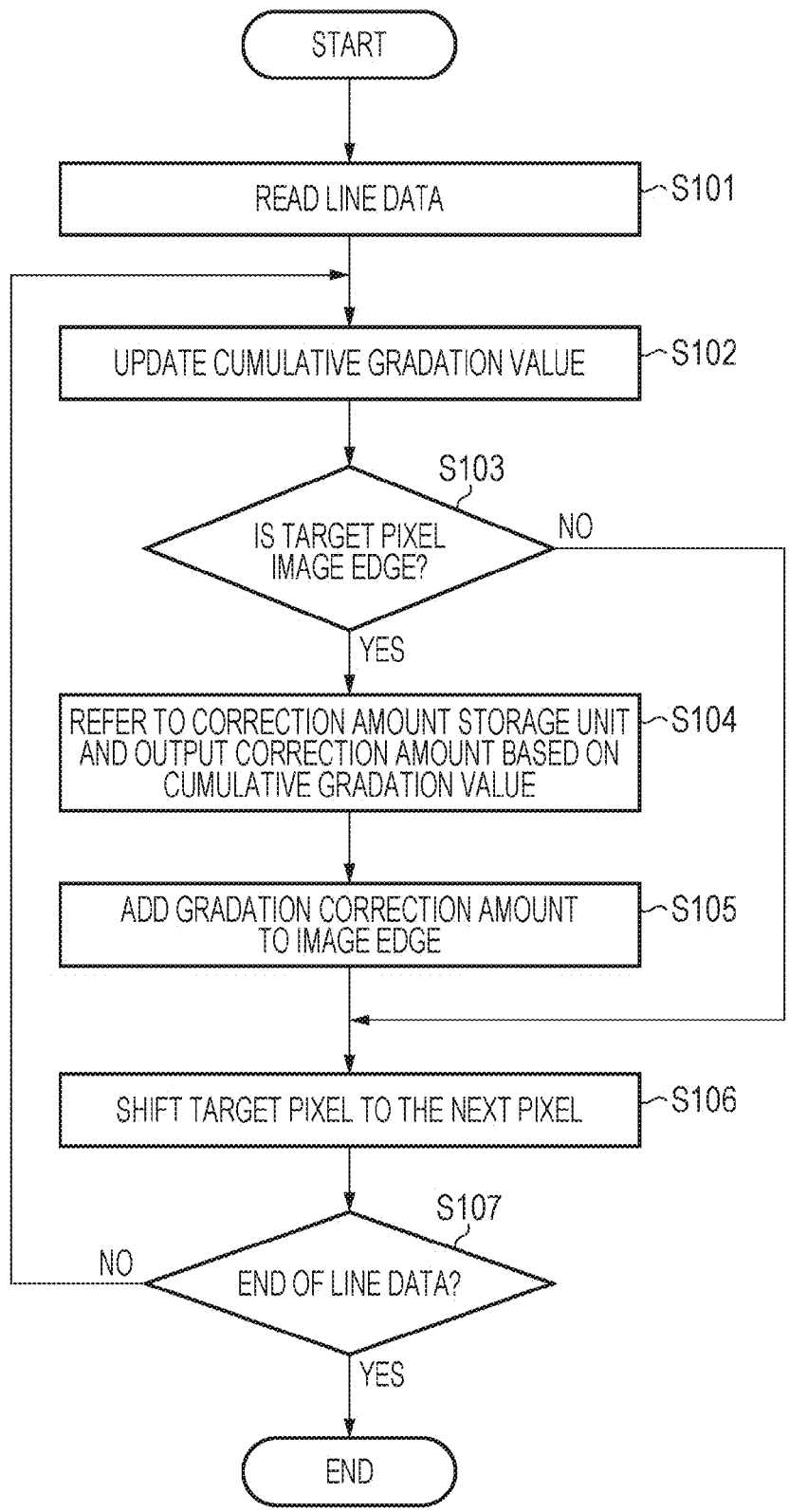
FIG. 4 is a diagram illustrating a process according to the first embodiment.

FIG. 4 is a flowchart illustrating a process performed by the line width correction processor 21. When an image formation start instruction is made, the CPU 201 receives image data in units of lines from a printer driver and transmits the image data to the image data storage unit 2101. In step S101, the CPU 201 performs line width correction processing while sequentially reading out pixels included in image data of a target line.

Figure 5:
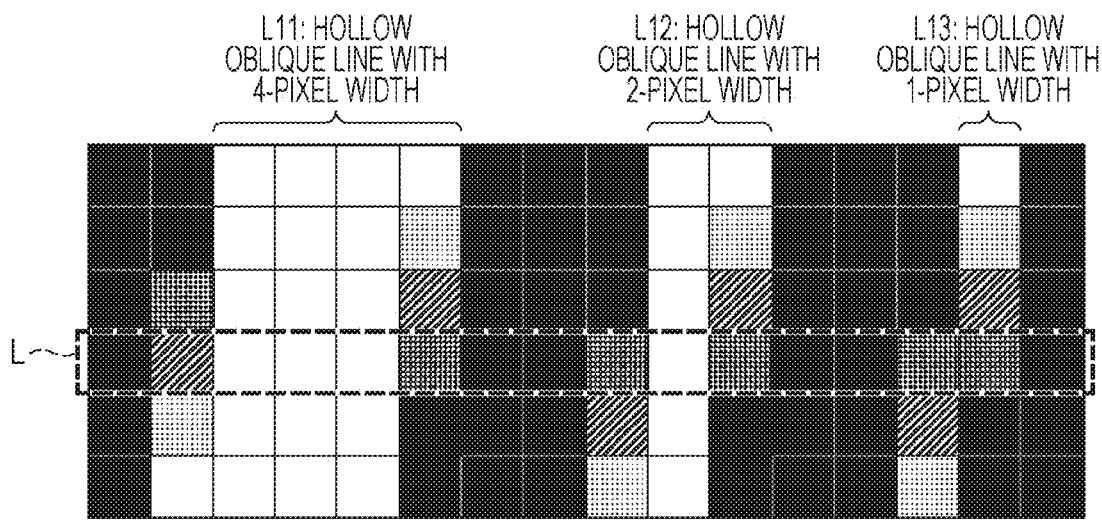
FIGS. 5A and 5B are diagrams illustrating exemplary processing according to the first embodiment.

FIG. 5A is a diagram illustrating exemplary image data including hollow oblique lines with different widths (L11=4-pixel width, L12=2-pixel width, and L13=1-pixel width). A hatched area may have already been subjected to smoothing processing. In smoothing processing, a white pixel (having the minimum density level) or a black pixel (having the maximum density level) is replaced with a halftone pixel to suppress the occurrence of jaggy (a phenomenon where an edge is not smooth and shows jaggedness). This smoothing processing is performed in a printer driver, but may be performed in an image forming apparatus.

Referring to FIG. 5B, a reference numeral 501 represents a series of pixels in a line L illustrated in. FIG. 5A as exemplary image data of a processing line read in step S101. In the first embodiment, line width correction processing is performed while sequentially reading target pixels from a leftmost pixel P1 to a pixel P16. A numerical value in each pixel in the image data 501 represents a white gradation level. In this embodiment, the gradation level of a white pixel (having the minimum density level) is set to 255, and the gradation level of a black pixel (having the maximum density level) is set to 0.

In step S102, the cumulative gradation value acquisition unit 2102 calculates a cumulative gradation value that is the cumulative sum of gradation values of pixels in a target pixel update direction. A dashed frame 502 in FIG. 5B represents a cumulative gradation value calculated and stored by the cumulative gradation value acquisition unit 2102 when each pixel (P1 to P16) becomes a target pixel. In a case where the gradation value of a target pixel is greater than or equal to 1 (there is a significant image component), the cumulative gradation value acquisition unit 2102 adds the gradation value of the target pixel to a cumulative gradation value at a preceding pixel to calculate a cumulative gradation value at the target pixel. In a case where the gradation value of a target pixel is 0, the cumulative gradation value acquisition unit 2102 resets a cumulative gradation value to 0. A cumulative gradation value is also reset in a case where a target pixel is the leftmost pixel (accumulation start pixel) in a line. For example, when a target pixel is P1, a cumulative gradation value is reset to 0 because the gradation value of P1 is 0 (or P1 is the leftmost pixel). When a target pixel is P2, the gradation value of P2 is added to a cumulative gradation value because the gradation value of P2 is greater than or equal to 1. In this example, the gradation value of 153 of the target pixel is added to the cumulative gradation value of 0 at the preceding pixel, so that a cumulative gradation value at the target pixel becomes 153. When a target pixel is P3, the gradation value of P3 is added to the cumulative gradation value because the gradation value of P3 is greater than or equal to 1. In this example, the gradation value of 255 of the target pixel is added to the cumulative gradation value of 153 at the preceding pixel, so that a cumulative gradation value at the target pixel becomes 408. Thus, at pixels P4 to P16, processing is similarly performed.

In this embodiment, when a cumulative gradation value is greater than or equal to 1024, a signal value of 1024 is output to limit the number of bits of a signal. The reason for this is that it is unnecessary to perform line width correction processing upon an image including a heavy line where a cumulative gradation value of 1024 is continuous.

In step 3103, the edge determination unit 2103 determines whether a target pixel is the edge of an image portion. A dashed frame 503 in FIG. 5B represents whether the edge determination unit has determined that each pixel (P1 to P16) is an edge when becoming a target pixel (edge, 1 and non-edge: 0). In the first embodiment, when the gradation value of a target pixel is greater than or equal to 1 (the target pixel includes a significant image component) and the gradation value of a pixel adjacent to the target pixel (hereinafter referred to as an adjacent pixel) is 0 (the pixel does not include a significant image component), the target pixel is determined to be an image edge. For example, when a target pixel is P6, P11, or P15, the target pixel is determined to an edge ("1") since the gradation value of the target pixel is greater than or equal to 1 and the gradation value of a right-hand pixel is 0. On the other hand, when a target pixel is another pixel, the pixel is determined to be a non-edge ("0") since the gradation value of the target pixel is 0 or the gradation value of the adjacent pixel is greater than or equal to 1. In a case where the target pixel is an image edge (S103: YES), the process proceeds to step S104. On the other hand, in a case where the target pixel is not an image edge (S103: NO), the process proceeds to step S106.

In step S104, the correction unit 2104 refers to a correction amount table in the correction amount storage unit 2105 to acquire a correction amount based on the cumulative gradation value. FIG. 6 is a diagram illustrating an example of a correction amount table stored in the correction amount storage unit 2105. This table stores gradation correction amounts corresponding to the cumulative gradation values of 1 to 1024. The larger the cumulative gradation value, the smaller the amount of correction. Referring back to FIG. 5B, a dashed frame 504 represents the amount of correction acquired from a correction amount table in the correction amount storage unit 2105 on the basis of a cumulative gradation value at a pixel determined to be an edge. Since a cumulative gradation value at the pixel P6 is 1020, the amount of correction becomes 0. Since a cumulative gradation value at the pixel P11 is 510, the amount of correction becomes 32.

In step S105, the correction unit 2104 adds the amount of correction acquired in step S104 to the target pixel. In a case where the gradation value of the target pixel acquired after the addition of the amount of gradation correction in step S105 is greater than the maximum gradation level of 255 that can be expressed at the target pixel, the excess gradation values are distributed to an adjacent pixel. Image data 505 in FIG. 5B represents a result of the addition of the gradation correction amount in the dashed frame 504 to the image data 501 in step S105. In a case where a target pixel is P6, P11, or P15, a result of the addition of the correction amount in the dashed frame 504 to the gradation value in the image data 501 is output. At that time, the larger the cumulative gradation value, the smaller the amount of correction. At the end of image data with a large pixel width, for example, at the pixel P6 at the edge of the hollow oblique line L11 with a four-pixel width, since a cumulative gradation value is large, the amount of correction is small. On the other hand, at the end of image data with a small pixel width, for example, at the pixel P15 at the edge of the hollow oblique line L13 with a 1-pixel width, since a cumulative gradation value is small, the amount of correction is large. As a result, it is possible to appropriately improve the reproducibility of an output image in accordance with the line width of image data.

Using the pulse width modulation processing and a pulse signal shift control in combination, it is possible to more accurately adjust a line width. The reason for this is that even in a case where only a part of a pixel is drawn, a line obtained by coupling pixels can be reproduced by shifting a pulse signal forward and rearward at the pixel. Thus, it is desired that a pulse signal generated at an adjacent pixel to which a correction value has been distributed from a target pixel, be subjected to shift control to be coupled to a pulse generated at the target pixel. In the case of an engine that expresses a white pixel using a light beam OFF signal, in order to couple a light beam OFF signal at an adjacent pixel to a light beam OFF signal at a target pixel (in order to shift a light beam ON signal rearward), shift control information at the adjacent pixel is rewritten.

In step S106, the target pixel is shifted to the next pixel, for example, in the right-hand direction pixel. In step S107, it is determined whether all pixels included in the image data acquired in step S101 have already been processed. In a case where it is determined that all pixels have yet to be processed, the process from step S102 to step S106 is repeated. In a case where it is determined that all pixels have already been processed, the process ends.

In the first embodiment, line width correction processing is performed at a target pixel in image data on the basis of the gradation value of the target pixel and the gradation value of an adjacent pixel. As a result, it is possible to appropriately improve the reproducibility of an output image with a small reference data range and the small amount of computation.

In the first embodiment, processing is performed on the basis of the gradation value of each pixel. Accordingly, even in the case of halftone image data that has been subjected to smoothing processing, it is possible to perform line width correction processing upon the image data by appropriately detecting the image width and edge of the image data.

In the first embodiment, line width correction processing is performed in a direction parallel to line-by-line image data. However, line width correction processing can also be performed in a direction orthogonal to line-by-line image data. In this case, the CPU 201 reads out two pieces of line-by-line image data and stores them in the image data storage unit 2101. The cumulative gradation value acquisition unit acquires, at the position of each pixel in a line direction, a cumulative gradation value in a direction orthogonal to the line direction. One of the two pieces of line-by-line image data stored in the image data storage unit 2101 is set as a target pixel line, and the other one of them is set as an adjacent pixel line. Line width correction processing is sequentially performed in a line direction and a direction orthogonal to the line direction while updating the two pieces of line-by-line image data one by one in the image data storage unit 2101. At that time, since pulse width modulation processing and control processing for shifting a pulse signal cannot be performed in combination in the direction orthogonal to the line direction, the same effect cannot be obtained even if the same amount of line width correction as that in the line direction is used in the orthogonal direction. It is desired that the amount of line width correction be adjusted in each direction and be stored in the correction amount storage unit.

In the first embodiment, in order to improve the reproducibility of a hollow thin line where thinning or a detail loss easily occurs because of blurring of an electrostatic latent image, a cumulative gradation value is acquired focusing on a white gradation level. However, there is a case where the reproducibility of a black thin line has a higher priority depending on an engine or image design. In such a case, line width correction processing may be performed using a cumulative gradation value acquired focusing on a black gradation level. That is, the gradation level of a white pixel (having the minimum density level) in image data is set to 0 and the gradation level of a black pixel (having the maximum density level) is set to 255 so that a white pixel becomes a ground portion and a black pixel becomes an image portion. The calculation of a cumulative value of gradation levels of black pixels and edge determination processing are then performed. As a result, the reproducibility of a black thin line can be improved.

In this embodiment, the correction amount storage unit 2105 stores a correction table. The correction table does not necessarily have to be stored, and the amount of correction may be calculated using the function of a curve representing the relationship between a cumulative gradation value and a correction amount illustrated in FIG. 6.

Second Embodiment

In the first embodiment, a method of improving the reproducibility of an output image using a cumulative gradation value acquired focusing on the gradation level of an image portion has been described. In the second embodiment, a method of more appropriately improving the reproducibility of an output image using a cumulative gradation value acquired focusing on both the gradation level of an image portion and the gradation level of a ground portion will be described. In this embodiment, the same reference numerals are used to identify operations and functions already described in the first embodiment, and the description thereof will be omitted as appropriate.

Figure 7:
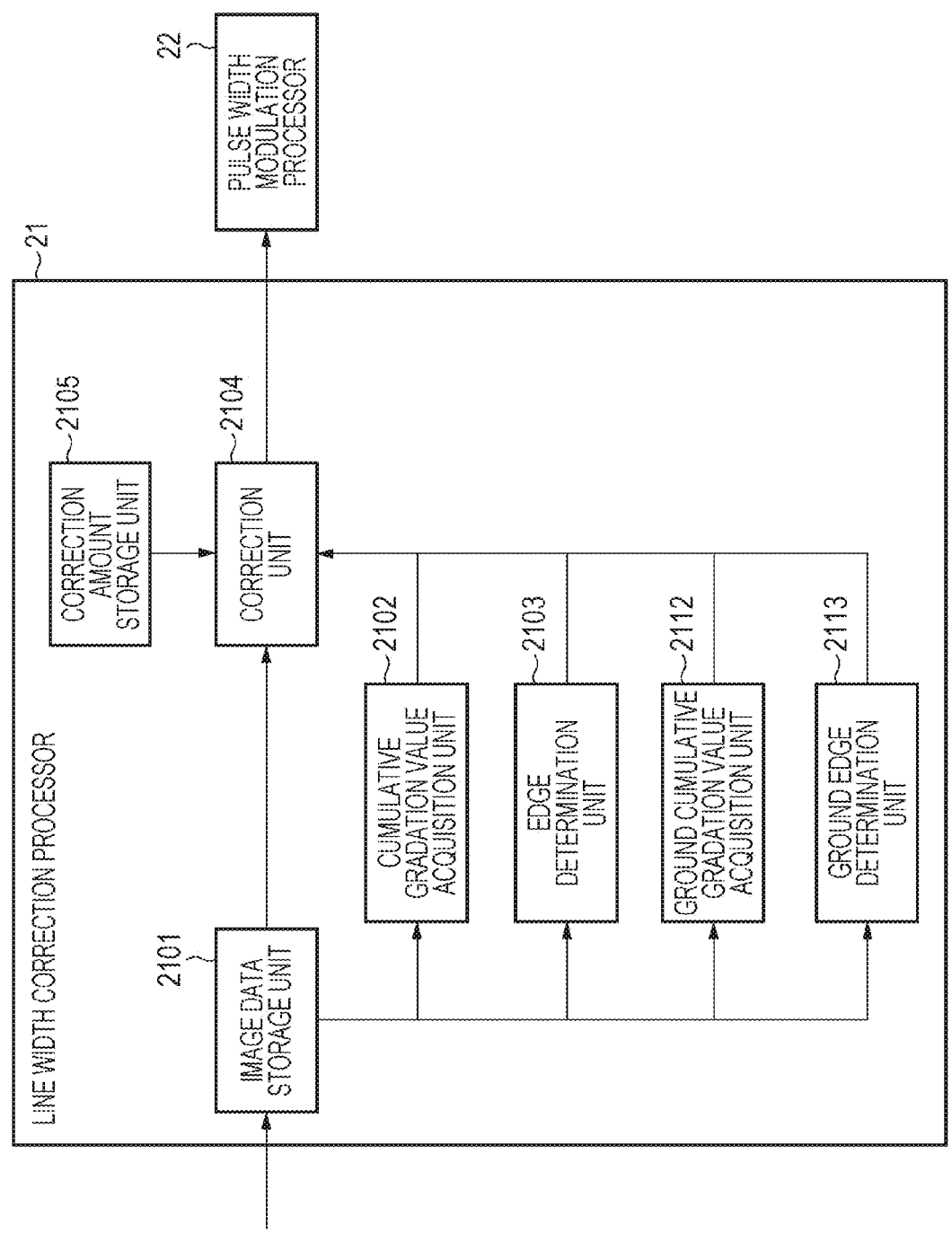
FIG. 7 is a block diagram illustrating the configuration of a processing unit according to a second embodiment of the present invention.

FIG. 7 is a block diagram of the line width correction processor 21 realized by the CPU 201 according to the second embodiment. The line width correction processor 21 includes the image data storage unit 2101, the cumulative gradation value acquisition unit 2102, a around cumulative gradation value acquisition unit 2112, the edge determination unit 2103, a ground edge determination unit 2113, the correction unit 2104, and the correction amount storage unit 2105.

The cumulative gradation value acquisition unit 2102 calculates and stores a cumulative gradation value that is the cumulative sum of gradation values of pixels focusing on the gradation level of an image portion in image data. In the second embodiment, calculation is performed under the assumption that the gradation level of a white pixel (having the minimum density level) in image data is 255 and the gradation level of a black pixel (having the maximum density level) in image data is 0. The ground cumulative gradation value acquisition unit 2112 calculates and stores a ground cumulative gradation value that is the cumulative sum of differences from the maximum gradation level of 255 at pixels focusing on the gradation level of a ground portion in image data. That is, calculation is performed under the assumption that the gradation level of a white pixel (having the minimum density level) is 0 and the gradation level of a black pixel (having the maximum density level) is 255. More specifically, the gradation level of a ground portion is calculated using the following equation.

Ground Portion Gradation Level=255−Image Portion Gradation Level

The edge determination unit 2103 detects a boundary between an image portion and a ground portion in a target pixel update direction. The ground edge determination unit 2113 detects a boundary between a ground portion and an image portion in a target pixel update direction. The correction amount storage unit 2105 stores a gradation correction amount corresponding to a cumulative gradation value and a non-image cumulative gradation value. The correction unit 2104 corrects the gradation value of a target pixel, which has been determined to be an edge by the edge determination unit 2103 and the ground edge determination unit 2113, with a correction amount corresponding to the edge stored in the correction amount storage unit 210. The corrected image data is output to the pulse width modulation processor 22.

[Line Width Correction Process]

Figure 8:
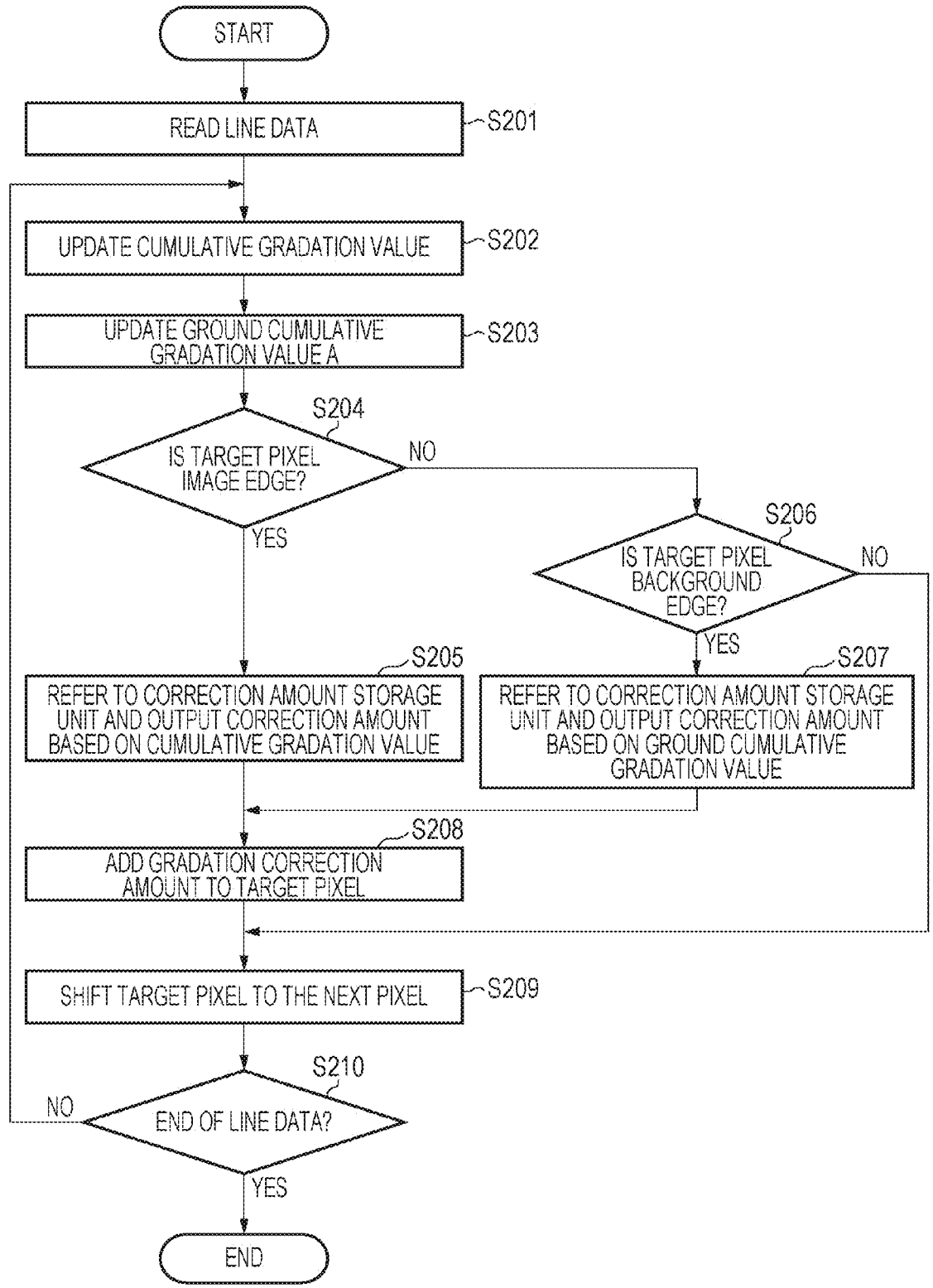
FIG. 8 is a diagram illustrating a process according to the second embodiment.

FIG. 8 is a flowchart illustrating a process performed by the line width correction processor 21 according to the second embodiment. When an image formation start instruction is made, the CPU 201 transmits line-by-line image data output from a printer driver to the image data storage unit 2101. In step S201, the CPU 201 reads out image data from the RAM 203. The CPU 201 performs line width correction processing upon the read image data of a processing line while updating a target pixel.

Figures 9A, 9B:
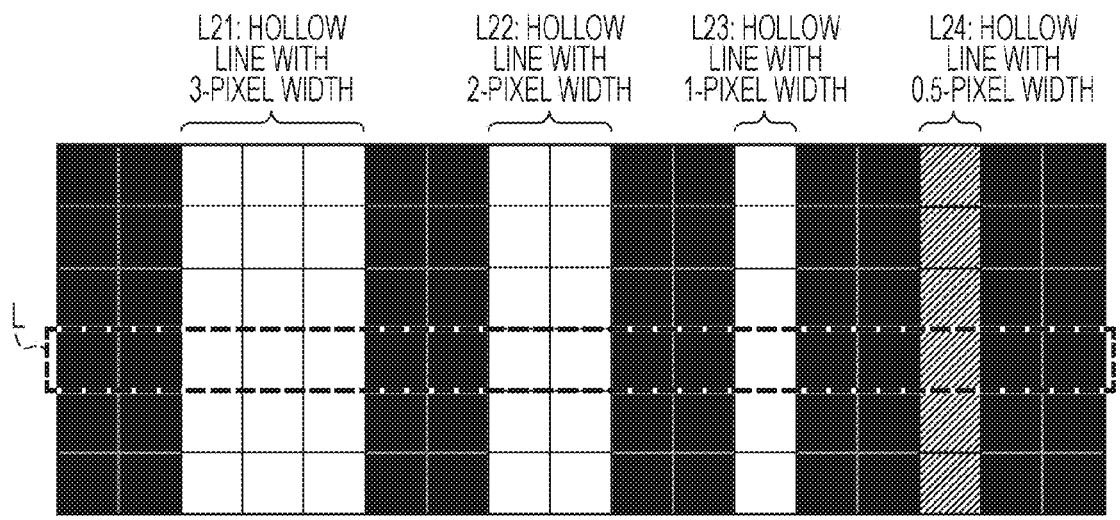
FIGS. 9A and 9B are diagrams illustrating exemplary processing according to the second embodiment.

FIG. 9A is a diagram illustrating exemplary image data including hollow lines with different widths (L12=3-pixel width, L22=2-pixel width, L23=1-pixel width, and L24=0.5-pixel width) output by an image processing apparatus.

Referring to FIG. 9B, a reference numeral 901 represents a series of pixels in a horizontal line L illustrated in FIG. 9A as exemplary image data of a processing line read in step S201. In the second embodiment, line width correction processing is performed while sequentially updating a target pixel from a pixel P1 to a pixel P17. A numerical value in each pixel represents a white gradation level.

In step S202, the cumulative gradation value acquisition unit 2102 calculates a cumulative gradation value that is the sum of white gradation levels of pixels in a target pixel update direction. A dashed frame 902 in FIG. 9B represents a cumulative gradation value calculated and stored by the cumulative gradation value acquisition unit when each pixel (P1 to P17) becomes a target pixel. For example, when a target pixel is P3, P4, P5, P8, P9, P12, or P15 having a gradation value greater than or equal to 1, the gradation value of the target pixel is added to a cumulative gradation value at a preceding pixel to calculate a cumulative gradation value at the target pixel. On the other hand, when a target pixel is P1, P2, P6, P7, P10, P11, P13, P14, P16, or P17 having a gradation value of 0, a cumulative gradation value at the target pixel is reset to 0.

In step S203, the ground cumulative gradation value acquisition unit 2112 calculates a ground cumulative gradation value that is the cumulative sum of black gradation levels of pixels in a target pixel update direction. A dashed frame 903 in FIG. 9B represents a ground cumulative gradation value calculated and stored by the ground cumulative gradation value acquisition unit 2112 when each pixel (P1 to P17) becomes a target pixel. In the second embodiment, in a case where the gradation value of a target pixel is less than or equal to 254, a difference between the maximum gradation value (255) and the gradation value of the target pixel (a reversal gradation value) is calculated as a ground cumulative gradation value. In a case where the gradation value of a target pixel is 255, a non-image cumulative gradation value is reset to 0. For example, in a case where a target pixel is P1, P2, P6, P7, P10, P11, P13, P14, P16, or P17 having a gradation value less than or equal to 254, the reversal gradation value of the target pixel is added to a cumulative gradation value at the preceding pixel to calculate a non-image cumulative gradation value at the target pixel. On the other hand, in a case where a target pixel is P3, P4, P5, P8, P9, P12, or P15 having a gradation value of 255, a non-image cumulative gradation value is reset to 0.

In step S204, the edge determination unit 2103 determines whether the target pixel is an edge of a white image. A dashed frame 904 in FIG. 9B represents whether the edge determination unit has determined that each pixel (P1 to P17) is an edge when becoming a target pixel (edge: 1 and non-edge: 0). In the second embodiment, when a cumulative gradation value at a target pixel is greater than or equal to 1 and the gradation value of a pixel adjacent to the target pixel (hereinafter referred to as an adjacent pixel) is 0, the target pixel is determined to be an image edge. In this embodiment, the pixels P5, P9, P12, and P15 are determined to be an image edge. In a case where the target pixel is an image edge (S204: YES), the process proceeds to step S205. On the other hand, in a case where a target pixel is not an image edge (S204: NO), the process proceeds to step S206.

In step S205, the correction unit 2104 refers to a correction amount table in the correction amount storage unit to acquire a correction amount based on the cumulative gradation value. FIG. 10A is a diagram illustrating an example of a correction amount table stored in the correction amount storage unit. This table stores gradation correction amounts corresponding to the cumulative gradation values of 1 to 1024. Referring back to FIG. 9B, a dashed frame 906 represents the amount of correction acquired from the correction amount table in the correction amount storage unit on the basis of a cumulative gradation value at a pixel determined to be an edge.

In step S206, the ground edge determination unit 2113 determines whether the target pixel is an edge of a black image. A dashed frame 905 in FIG. 9B represents whether the ground edge determination unit 2113 has determined that each pixel (P1 to P17) is a ground edge when becoming a target pixel (edge: 1 and non-edge: 0). In the second embodiment, when a ground cumulative gradation value at a target pixel is greater than or equal to 1 and the gradation value of pixel adjacent to the target pixel (hereinafter referred to as an adjacent pixel) is 255, the target pixel is determined to be an non-image edge. In this embodiment, the pixels P2, P7, and P11 are determined to be a non image edge. In a case where the target pixel is a ground edge (S206: YES), the process proceeds to step S207. On the other hand, in a case where the target pixel is not a ground edge (S206: NO), the process proceeds to step S209.

In step S207, the correction unit 2104 refers to a correction amount table in the correction amount storage unit 2105 to acquire the amount of ground width correction based on the ground cumulative gradation value. FIG. 10B is a diagram illustrating an example of a correction amount table stored in the correction amount storage unit 2105. This table stores gradation correction amounts corresponding to the ground cumulative gradation values of 1 to 1024. The larger the cumulative gradation value, the small the absolute value of a correction amount.

Referring back to FIG. 9B, a dashed frame 907 represents the amount of correction acquired from the correction amount table in the correction amount storage unit on the basis of a ground cumulative gradation value at a pixel determined to be a ground edge.

In step S208, the correction unit 2104 adds the amount of gradation correction acquired in steps S205 and S207 to the target pixel. In a case where the gradation value of the target pixel acquired after the addition of the amount of gradation correction in step S208 is greater than the maximum gradation level of 255 that can be expressed at the target pixel, the excess gradation values are distributed to an adjacent pixel. For example, when a target pixel is P5, P9, or P12 having the gradation value of 255, the gradation value of the target pixel after the addition of the amount of correction exceeds the maximum gradation level that can be expressed at the target pixel. Accordingly, the amount of correction is added to the gradation value of the adjacent pixel P6, P10, or P13. When a target pixel is P15, the value of: +127 out of the correction amount of +192 is added to the target pixel to achieve the maximum density level of 255 at the target pixel and then the remaining correction amount (192−127=65) is added to the adjacent pixel P16.

In the case of an engine that expresses a white pixel using a light beam OFF signal, in order to couple a light beam OFF signal at an adjacent pixel to a light beam OFF signal at a target pixel (in order to shift a light beam ON signal rearward), shift control information at the adjacent pixel is rewritten.

In a case where the gradation value of a target pixel acquired after the addition of the amount of gradation correction is less than the minimum gradation level of 0 that can be expressed at the target pixel, the negative gradation values are distributed to an adjacent pixel. For example, when the target pixel is P2, P7, or P11 having the gradation value of 0, the gradation value of the target pixel after the addition of the amount of correction is less than the minimum gradation level that can be expressed at the target pixel. Accordingly, the amount of correction is added to the gradation value of the adjacent pixel P3, P8, or P12.

In the case of an engine that expresses a black pixel using a light beam ON signal, in order to couple a light beam ON signal at an adjacent pixel to a light beam ON signal at a target pixel (in order to shift a light beam ON signal forward), shift control information at the adjacent pixel is rewritten.

In the case of target pixel upon which both the correction of an image portion and the correction of a ground portion are performed at the same time, the difference between the amount of correction of an image portion and the amount of correction of a ground portion (| image portion correction amount|−|ground portion correction amount|) may be calculated and set as the amount of correction for the target pixel. When a target pixel is P12, the sum of the image portion correction amount of +128 at the pixel P12 in the dashed frame 906 and the correction amount of −16 in the dashed frame 907 which is distributed from the pixel P11 to the pixel P12 is calculated and a result of the summation (+102) is added to the target pixel. At that time, since the gradation value of the target pixel is 255 and the gradation value of the target pixel after the addition of the correction amount exceeds the maximum gradation level that can be expressed at the target pixel, the correction amount of 102 is added to the gradation value of the adjacent pixel P13.

In step S209, the target pixel is shifted to the next pixel, for example, in the right-hand direction by one pixel. In step S210, it is determined whether all pixels included in the image data acquired in step S201 have already been processed. In a case where it is determined that all pixels have yet to be processed, the process from step S202 to step S210 is repeated. In a case where it is determined that all pixels have already been processed, the process ends. Referring to FIG. 9B, image data 908 represents a result of pieces of processing of steps S202 to S210 performed upon the image data 901. As represented in the image data 908, in the line width correction processing according to the second embodiment, the gradation value of a target pixel determined to be an image edge or a ground edge is corrected using the amount of correction based on the line width of an image portion or a ground portion at each pixel in a target pixel update direction. Accordingly, not only an image portion but also a ground portion can be prevented from undergoing thinning or a detail loss.

In the second embodiment, the enlargement of an image portion is performed at the rear end of the image portion and the enlargement of a ground portion is performed at the front end of an image portion (the rear end of the ground portion). Since the image portion enlargement and the ground portion enlargement do not interfere with each other, line width correction can be appropriately performed.

Third Embodiment

In the first embodiment, correction processing is performed on the basis of the gradation value of each pixel in image data. In the third embodiment, a single pixel includes a plurality of pixel pieces, and correction processing is performed on the basis of the number of pixel pieces representing an ON or OFF state. In the third embodiment, the same reference numerals are used to identify configurations already described in the first embodiment, and the description thereof will be therefore omitted.

In the third embodiment, the gradation level of each pixel in image data ranges from 0 to 16 (17 gradation levels). It is assumed that a printer driver in the image processing apparatus 1 outputs image data having 17 gradation levels. Alternatively, the image forming apparatus 2 may have a configuration for converting image data having 256 gradation levels into image data having 17 gradation levels. In the third embodiment, a single pixel includes 16 pixel pieces, and pixel pieces, the number of which corresponds to a gradation value, are set to ON state (binary expression). In this embodiment, an exposed portion becomes white. Accordingly, in each pixel, white pixel pieces, the number of which corresponds to a gradation value, are present. The larger the number of white pixels in a pixel, the longer an exposure period for the recording of the pixel. The number of pixel pieces included in each pixel is set to 16 in the third embodiment, but does not necessarily have to be 16. By providing N number of pixel pieces in a single pixel, (N+1) gradation levels can be expressed at the pixel.

<Details of Line Width Correction Processing>

Figure 11:
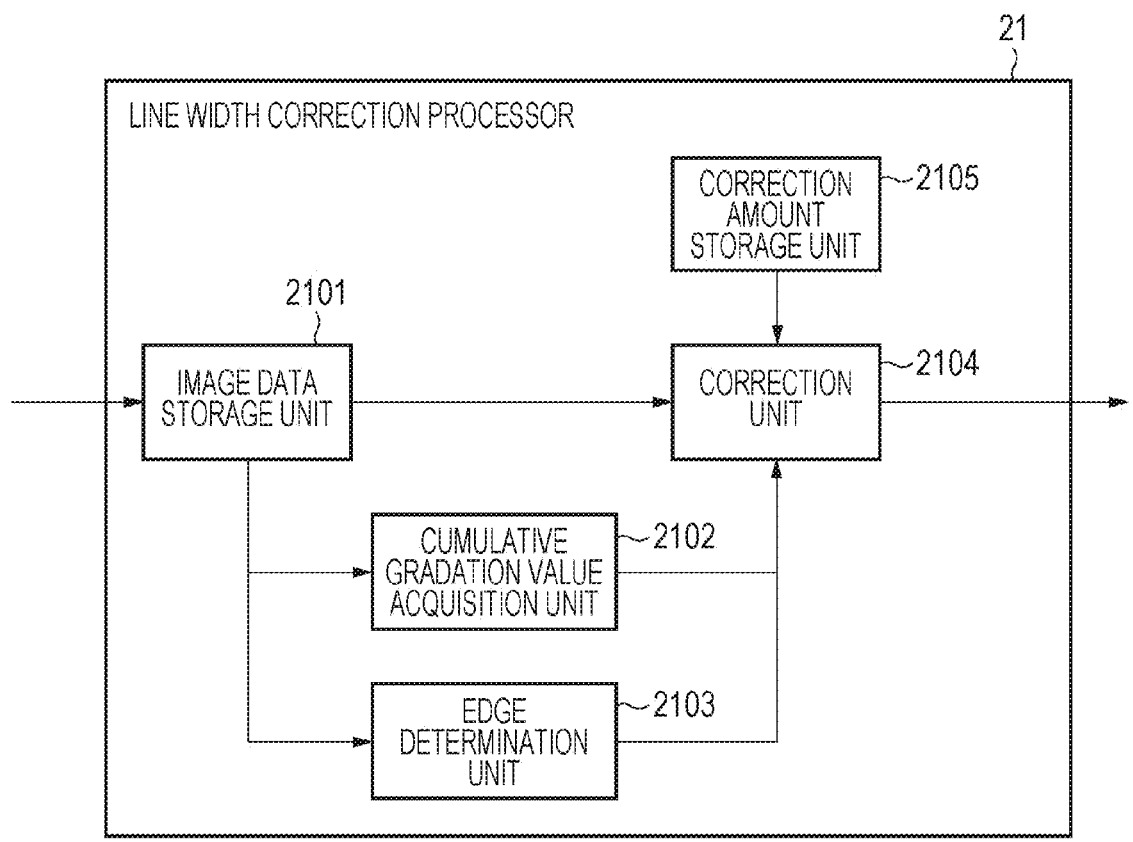
FIG. 11 is a block diagram illustrating the configuration of a processing unit according to a third embodiment of the present invention.

Line width correction processing will be described in detail below. FIG. 11 is a block diagram illustrating functions performed by the CPU 201 according to the third embodiment. The line width correction processor 21 is a mechanism for performing line width correction processing upon image data transmitted from a printer driver, and includes the image data storage unit 2101, the cumulative gradation value acquisition unit 2102, the edge determination unit 2103, the correction unit 2104, and the correction amount storage unit 2105.

Figure 12:
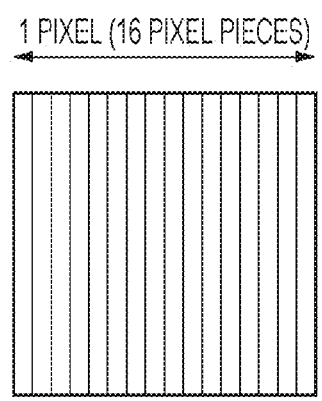
FIG. 12 is a diagram describing the configuration of a pixel according to the third embodiment.

The CPU 201 acquires image data (for example, 8-bit image data) in a scanning direction of light beam output from an image forming apparatus in units of lines and stores them in the image data storage unit 2101 in the RAM 203. A single pixel includes a plurality of pixel pieces for controlling the ON/OFF states of light. FIG. 12 is a diagram illustrating an exemplary pixel. Referring to the drawing, a single pixel includes 16 pixel pieces whose state can be switched between an image portion and a around portion. That is, at a single pixel, 16 gradation levels can be expressed. The size of a single pixel in the horizontal direction is equivalent to 1 dot (the width of 42.3 μm) at 600 dpi. The size of a single pixel piece in a single pixel is therefore equivalent to 1/16 dot (the width of approximately 2.65 μm).

The cumulative gradation value acquisition unit 2102 calculates and stores a cumulative gradation value that is the cumulative sum of pixel pieces in each pixel in image data. In the third embodiment, in order to improve the reproducibility of a hollow line where thinning or a detail loss easily occurs because of degradation in an electrostatic latent image, line width correction processing is performed focusing on the gradation level of a white portion. The cumulative gradation value acquisition unit 2102 therefore calculates the cumulative such of continuous white pixel pieces.

The edge determination unit 2103 detects the boundary between an image portion and a ground portion in image data. The correction amount storage unit 2105 stores the amount of gradation correction based on a cumulative gradation value. The correction unit 2104 refers to the amount of correction stored in the correction amount storage unit 2105 and corrects the gradation value of a target pixel determined to be an edge by the edge determination unit 2103. The corrected image data is output to the driving unit 204.

<Exemplary Line Width Correction Processing>

Figure 13:
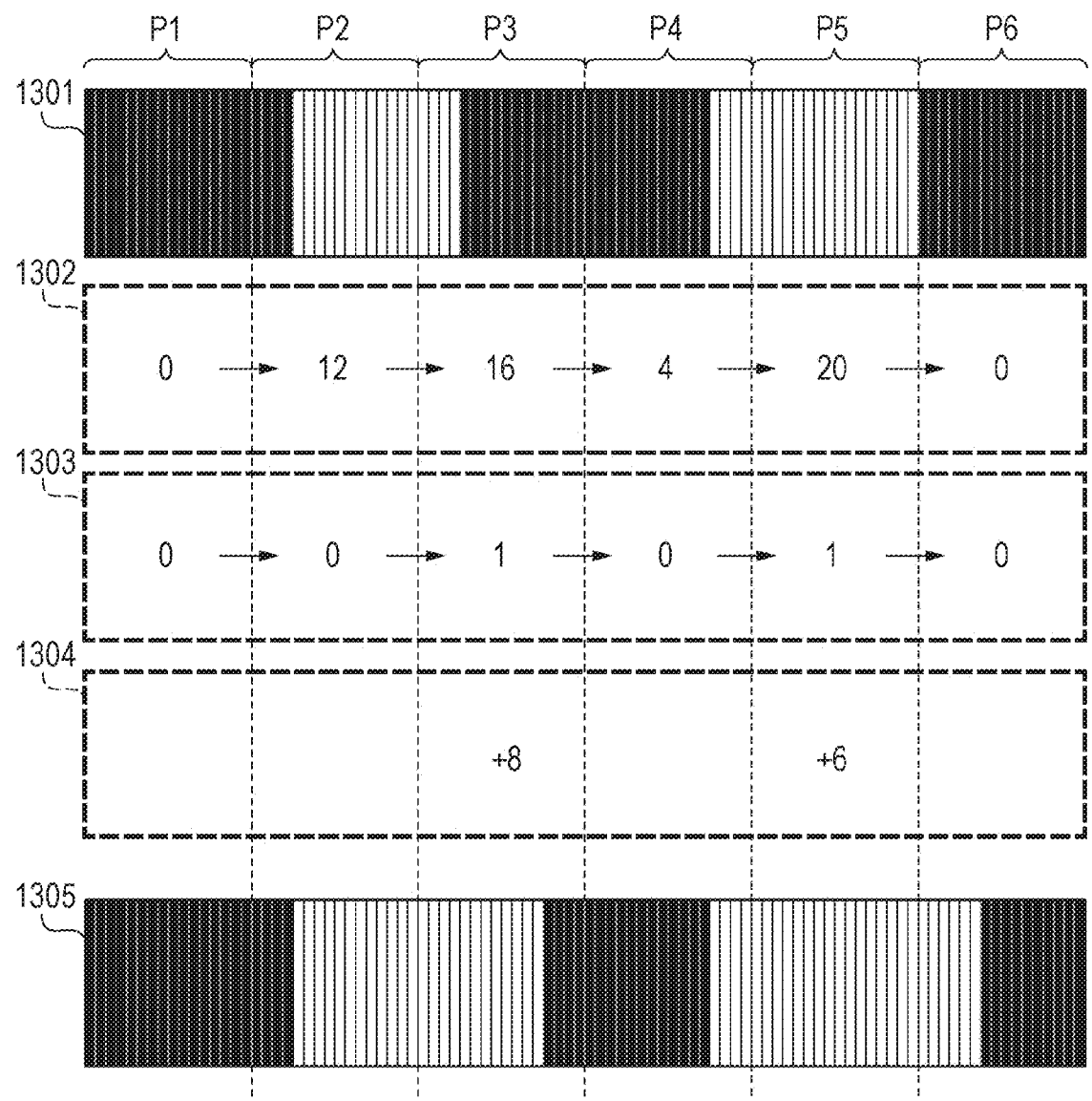
FIG. 13 is a diagram illustrating exemplary processing according to the third embodiment.

Referring to FIG. 13, a reference numeral 1301 represents an example of image data of a processing line. In the third embodiment, line width correction processing is performed while sequentially updating a target pixel from a pixel P1 to a pixel P6.

The cumulative gradation value acquisition unit 2102 calculates a cumulative gradation value that is the cumulative sum of white pixel pieces (ON-state pixel pieces) in each pixel in a target pixel update direction. A dashed frame 1302 in FIG. 13 represents a cumulative gradation value calculated and stored by the cumulative gradation value acquisition unit 2102 when each pixel (P1 to P6) becomes a target pixel. In the third embodiment, in a case where a white pixel piece in a target pixel is adjacent to a preceding pixel (left-hand pixel), the number of white pixel pieces in the target pixel is added to a cumulative gradation value. In a case where a white pixel piece in a target pixel is not adjacent to a preceding pixel, a cumulative gradation value is reset to 0 and the number of white pixel pieces is then added to the cumulative gradation value. For example, when a target pixel is P1, a white pixel piece is not adjacent to a preceding pixel. A cumulative gradation value is therefore reset to 0 and then the number of white pixel pieces is added to the cumulative gradation value. In this example, since the number of white pixel pieces is 0, a cumulative gradation value becomes 0. When a target pixel is P2, a white pixel piece is not similarly adjacent to a preceding pixel. A cumulative gradation value is therefore reset to 0 and then the number of white pixel pieces is added to the cumulative gradation value. In this example, since the number of white pixel pieces is 12, the cumulative gradation value becomes 12. When a target pixel is P3, a white pixel piece is adjacent to a preceding pixel. The number of white pixel pieces is therefore added to a cumulative gradation value. In this example, since the number of white pixel pieces is 4, a cumulative gradation value becomes 16. Thus, at pixels P3 to P6, processing is similarly performed. In this embodiment, even in a case where a cumulative gradation value is greater than or equal to 64, a signal value of 64 is output to limit the number of bits of a signal. The reason for this is that it is unnecessary to perform line width correction processing upon an image including a heavy line including 64 continuous pixel pieces or more that are image portions.

The edge determination unit 2103 determines whether the target pixel is located at the boundary between an image portion and a ground portion. A dashed frame 1303 in FIG. 13 represents whether the edge determination unit has determined that each pixel (P1 to P6) is an edge when becoming a target pixel (edge: 1 and non-edge: 0). In the third embodiment, in a case where a target pixel includes a white pixel piece whose rear end is adjacent to a black pixel piece, the target pixel is determined to be an edge. For example, when a target pixel is P1, P2, P4, or P6, the target pixel is determined to be a non-edge (0) because the target pixel does not include a white pixel piece whose rear end is adjacent to a black pixel piece. On the other hand, when a target pixel is P3 or P5, the target pixel is determined to be an edge (1) because the target pixel includes a white pixel piece whose rear end is adjacent to a black pixel piece. In the case of a target pixel such as P2 or P5 including a white pixel piece adjacent to an adjacent pixel, the determination of whether the target pixel is an edge can be performed by referring to the first pixel piece in the adjacent pixel.

In a case where it is determined that the target pixel is an edge, the CPU 201 refers to the correction amount table in the correction amount storage unit to acquire a correction amount based on the cumulative gradation value. FIG. 14 is a diagram illustrating an example of a correction amount table stored in the correction amount storage unit. This table stores gradation correction amounts corresponding to the cumulative gradation values of 1 to 64. Referring back to FIG. 13, a dashed frame 1304 represents the amount of correction acquired from a correction amount table in the correction amount storage unit on the basis of a cumulative gradation value at a pixel determined to be an edge.

The CPU 201 changes a black pixel piece adjacent to a white pixel piece to a white pixel piece on The basis of the amount of correction based on the cumulative gradation value at the target pixel to increase the width of an image portion (white pixel). In a case where the amount of correction exceeds the number of black pixel pieces in the target pixel, black pixel pieces in the adjacent pixel are sequentially changed to a white pixel piece starting from the first pixel piece.

Image data 1305 in FIG. 13 represents a result of line width correction processing according to the third embodiment performed upon the image data 1301. The line width of image data is acquired by calculating the cumulative sum of pixel pieces in each pixel in a target pixel update direction, and a pixel piece located at an edge is corrected using the amount of correction based on the line width. As a result, it is possible to appropriately improve the reproducibility of an output image with a small reference data range and the small amount of computation.

Other Embodiments

In the above-described embodiments, toner is not applied to an exposed portion in an image forming apparatus. However, an image forming apparatus in which toner is applied to an exposed portion may be used.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230697 filed Nov. 26, 2015, which is hereby incorporated by reference herein in its entirety.

What is claimed is:

1. An image forming apparatus for forming an image by performing scanning exposure upon a photosensitive member on the basis of a gradation value represented by pixel data, comprising:
   a reading unit configured to sequentially read, from image data, pieces of pixel data of target pixels along a predetermined direction;
   a cumulative sum calculation unit configured to calculate a cumulative sum of gradation values represented by pieces of pixel data of target pixels in a significant image portico read by the reading unit;
   a determination unit configured to determine whether the target pixel read by the reading unit is located at a boundary between the significant image portion and a background portion that is a non-significant image portion; and
   a correction unit configured to, in a case where the determination unit determines that the target pixel is located at the boundary, correct a gradation value represented by pixel data of the target pixel by adding a correction amount based on the cumulative sum up to the target pixel calculated by the cumulative sum calculation unit to the gradation value.

2. The image forming apparatus according to claim 1, wherein, in a case where a gradation value represented by pixel data of a target pixel is a value representing a background portion, the cumulative sum calculation unit resets the cumulative sum.

3. The image forming apparatus according to claim 1, wherein, in a case where a gradation value represented by pixel data of the target pixel includes a significant image component and a gradation value represented by pixel data of a next pixel does not include a significant image component, the determination unit determines that the target pixel is located at an edge.

4. The image forming apparatus according to claim 1, wherein the smaller the cumulative sum, the larger a correction amount that the correction unit adds to a gradation value represented by pixel data of the target pixel.

5. The image forming apparatus according to claim 1, further comprising a pulse-width modulation (PWM) unit configured to control an exposure period for a single pixel by determining the number of pixel pieces to be subjected to exposure out of N number of pixel pieces set in advance in the pixel along a direction of the scanning exposure.

6. The image forming apparatus according to claim 1, further comprising:
   a second cumulative sum calculation unit configured to calculate a cumulative sum of differences between a gradation value represented by pixel data of a target pixel read by the reading unit and an upper limit of a gradation value of a significant image portion as a cumulative sum of gradation values of non-significant image portions;
   a second determination unit configured to determine whether the target pixel read by the reading unit is located at a boundary between the non-significant image portion and the significant image portion; and
   a second correction unit configured to, in a case where the second determination unit determines that the target pixel is located at the boundary, correct a gradation value represented by pixel data of the target pixel by adding a correction amount based on the cumulative sum up to the target pixel calculated by the second cumulative sum calculation unit to the gradation value.

7. A non-transitory storage medium storing a program causing a computer to execute a control method for an image forming apparatus for forming an image by performing scanning exposure upon a photosensitive member on the basis of a gradation value represented by pixel data, the method comprising:
   sequentially reading, from image data, pieces of pixel data along a predetermined direction;
   calculating a cumulative sum of gradation values represented by pieces of pixel data of target pixels in a significant image portion read in the reading;
   determining whether the target pixel read in the reading is located at a boundary between the significant image portion and a background portion that is a non-significant image portion; and
   correcting, in a case where it is determined that the target pixel is located at the boundary in the determining, a gradation value represented by pixel data of the target pixel by adding a correction amount based on the cumulative sum up to the target pixel calculated in the calculating to the gradation value.

8. A control method for an image forming apparatus for forming an image by performing scanning exposure upon a photosensitive member on the basis of a gradation value represented by pixel data, comprising:
   sequentially reading, from image data, pieces of pixel data along a predetermined direction;
   calculating a cumulative sum of gradation values represented by pieces of pixel data of target pixels in a significant image portion read in the reading;
   determining whether the target pixel read in the reading is located at a boundary between the significant image portion and a background portion that is a non-significant image portion; and
   correcting, in a case where it is determined that the target pixel is located at the boundary in the determining, a gradation value represented by pixel data of the target pixel by adding a correction amount based on the cumulative sum up to the target pixel calculated in the calculating to the gradation value.

* * * * *